(12) United States Patent
Funada

(10) Patent No.: US 9,302,585 B2
(45) Date of Patent: Apr. 5, 2016

(54) METER

(75) Inventor: Yasushi Funada, Saitama (JP)

(73) Assignee: CALSONIC KANSEI CORPORATION, Saitama (JP)

( * ) Notice: Subject to any disclaimer, the term of this patent is extended or adjusted under 35 U.S.C. 154(b) by 170 days.

(21) Appl. No.: 13/505,807

(22) PCT Filed: Oct. 25, 2010

(86) PCT No.: PCT/JP2010/068802
§ 371 (c)(1),
(2), (4) Date: May 3, 2012

(87) PCT Pub. No.: WO2011/055646
PCT Pub. Date: May 12, 2011

(65) Prior Publication Data
US 2012/0218493 A1 Aug. 30, 2012

(30) Foreign Application Priority Data
Nov. 6, 2009 (JP) .................... 2009-254720

(51) Int. Cl.
B60K 35/00 (2006.01)
B60K 37/02 (2006.01)
G01D 11/28 (2006.01)

(52) U.S. Cl.
CPC ............... *B60K 35/00* (2013.01); *B60K 37/02* (2013.01); *G01D 11/28* (2013.01); *B60K 2350/203* (2013.01)

(58) Field of Classification Search
USPC .......................................................... 349/11
See application file for complete search history.

(56) References Cited

U.S. PATENT DOCUMENTS

| 5,915,822 A * | 6/1999 | Ogura et al. ................. 362/26 |
| 6,276,809 B1 * | 8/2001 | Matsumoto .................. 362/26 |
| 6,450,656 B1 * | 9/2002 | Noll ............................ 362/23 |
| 6,714,126 B2 * | 3/2004 | Wada ......................... 340/438 |
| 7,669,545 B2 * | 3/2010 | Fournier .................... 116/288 |
| 2006/0290486 A1 * | 12/2006 | Sumiya et al. ............. 340/461 |
| 2008/0174416 A1 * | 7/2008 | Pala et al. .................. 340/461 |
| 2011/0164396 A1 * | 7/2011 | Obata ......................... 362/26 |

FOREIGN PATENT DOCUMENTS

| JP | 2002-347460 | 12/2002 |
| JP | 2002-357460 | 12/2002 |

(Continued)

OTHER PUBLICATIONS

International Search Report issued Nov. 16, 2010 in International (PCT) Application No. PCT/JP2010/068802.

(Continued)

Primary Examiner — Edward Glick
Assistant Examiner — Anthony G Quash
(74) Attorney, Agent, or Firm — Wenderoth, Lind & Ponack, L.L.P.

(57) ABSTRACT

A meter includes a liquid crystal display having a liquid crystal display surface and a case housing the liquid crystal display surface, an analog meter device including a dial portion having a plurality of translucent indicators, a light source configured to illuminate the dial portion from a back side of the dial portion, and an illumination light-passing section formed in a lateral edge portion of the case, configured to pass light from the light source toward the translucent indicator.

7 Claims, 10 Drawing Sheets

(56) References Cited

FOREIGN PATENT DOCUMENTS

| JP | 2003-106875 | | 4/2003 | |
| JP | 2004-61326 | | 2/2004 | |
| JP | 2005-24306 | | 1/2005 | |
| JP | 2005-24526 | | 1/2005 | |
| JP | 2006-194613 | * | 7/2006 | ............ G01D 11/28 |
| JP | 2007-114735 | | 5/2007 | |
| JP | 2007-121101 | | 5/2007 | |
| JP | 2009-128257 | * | 6/2009 | ............ G01D 11/28 |
| JP | 2009-151251 | | 7/2009 | |
| JP | 2010127832 A | * | 6/2010 | ............ G01D 7/00 |
| WO | WO 2010024169 A1 | * | 3/2010 | ............ G01D 11/28 |

OTHER PUBLICATIONS

Extended European Search Report dated Dec. 4, 2014 issued in corresponding European application No. 10828206.2.

* cited by examiner

B SECTION

C SECTION

METER

TECHNICAL FIELD

The present invention relates to a meter for use in a vehicle such as an automobile. In particular, the present invention relates to a combination meter in which an analogue meter is disposed adjacent to a liquid crystal display.

BACKGROUND ART

A combination meter 1 in which a single or a plurality of analogue meters 2 such as a speedmeter or a tachometer is combined with a liquid crystal display 3 to form a display surface on which various vehicle information is displayed is conventionally known as an automobile meter as illustrated in FIG. 10 (refer to, for example, Patent Document 1).

The constitution of the combination meter 1 will be hereinafter described. The conventional combination meter 1 includes an approximately box-shaped meter housing 5 provided in an instrument panel located in front of a driver's seat in a vehicle interior and an opening for a dial 5a concaved on the vehicle interior side.

A display surface member 4 constituting the plate-like display surface is mounted on the opening for a dial 5a.

An opening for a liquid crystal display 4a is formed in the approximately central portion of the lower portion of the display surface member 4 in the vehicle width direction. The liquid crystal display 3 from which a liquid crystal display surface 3a is exposed is provided in the opening for a liquid crystal display 4a to be visible from the vehicle interior direction.

The liquid crystal display surface 3a of the liquid crystal display 3 of the combination meter 1 is formed in a rectangular shape in which its longitudinal direction conforms to the vehicle width direction. A pair of dials 2a, 2a of the analogue meters 2, 2 such as tachometers is provided to the right and left in the upper portion of the display surface member 4 provided with the liquid crystal display 3. Facing outer rim portions 2c, 2c of the analogue meters 2, 2 include therebetween a predetermined measurement W1.

A common light-guiding member 6 is provided on the back sides of the liquid crystal display surface 3a and the dials 2a, 2a of the display surface member 4.

The light-guiding member 6 is configured to transmit illumination light by a transparent member, and includes on the back side thereof a triangular groove 6a which adjusts illumination light from a backlight LED light source 3b built in the liquid crystal display 3 and illumination light from a backlight source 2b of the analogue meter device 2.

Next, the operation and effect of the conventional meter will be described.

The illumination light from the backlight source 2b of the analogue meter device 2 guided from the side through the light-guiding member 6 disposed on the back side of the dial 2a is reflected by the triangular groove 6a in the direction of the bottom face of the meter housing 5.

For this reason, a light volume and an illumination shape of the liquid crystal display 3 and the analogue meters 2 close to a desired light volume and a desired illumination shape are obtained even if the light-guiding member 6 for performing the backlight illumination of the liquid crystal display 3 and the analogue meters 2, 2 is integrally constituted.

PRIOR ART DOCUMENT

Patent Document

Patent Document 1: Japanese Patent Application Publication No. 2005-24526 (paragraphs 0020-0111, FIG. 1).

SUMMARY OF THE INVENTION

Problems to be Solved by the Invention

In the conventional meter constituted as described above, as illustrated by the two-dot chain line in the figure, the liquid crystal display 3 is provided between the analogue meters 2, 2, and the facing outer rim portions 2c, 2c of the analogue meters 2, 2 are overlapped with the right and left lateral edge portions of the case of the liquid crystal display 3 so as to increase a displayable area of the dials 2a, 2a of the analogue meter devices 2, 2. Namely, the width W2 between the right and left lateral edge portions of the case of the liquid crystal display 3 is larger than the width W1 between the outer rim portions 2c, 2c of the analogue meters 2, 2.

However, the illumination light of the backlight sources 2b, 2b does not reach the outer rim portions 2c, 2c of the analogue meter devices 2, 2 in the overlapped portions due to the shade of the right and left lateral edge portions, so that illumination unevenness occurs due to a difference in the light volume from the circumferential portion. Because of this, the external appearance quality may be deteriorated.

It is, therefore, an object of the present invention to provide a meter in which an outer appearance quality is improved by even backlight illumination.

Means for Solving the Problem

In order to achieve the above object, a meter of an embodiment of the present invention includes a liquid crystal display having a liquid crystal display surface and a case housing the liquid crystal display surface, an analogue meter device including a dial portion having a plurality of translucent indicators, a light source configured to illuminate the dial portion from a back side of the dial portion, and an illumination light-passing section formed in a lateral edge portion of the case, configured to pass light from the light source toward the translucent indicator.

DESCRIPTION OF EMBODIMENT

Hereinafter, a meter of an embodiment of the present invention will be described with reference to FIGS. 1-9.

Figure 6:
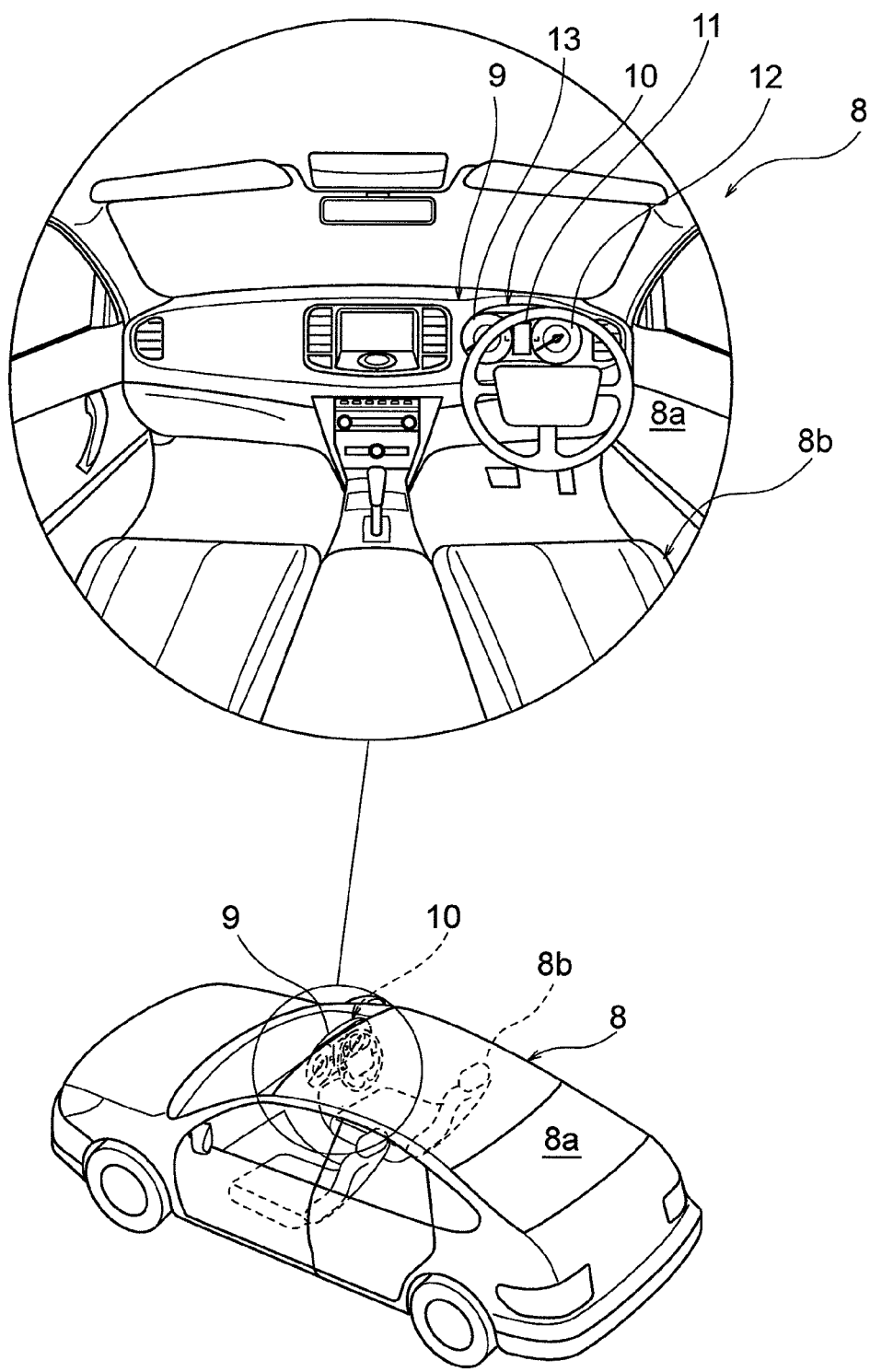
FIG. 6 is a side view of a vehicle and a front view of a vehicle interior illustrating the arrangement of the combination meter as the meter of the embodiment of the present invention.

First of all, the constitution of the meter is described. A combination meter 10 of a display device for a vehicle is provided in an instrument panel 9 located in front of a driver's seat 8b in a passenger compartment 8a of an automobile 8 as illustrated in FIG. 6 as the meter of the embodiment.

Figure 1:
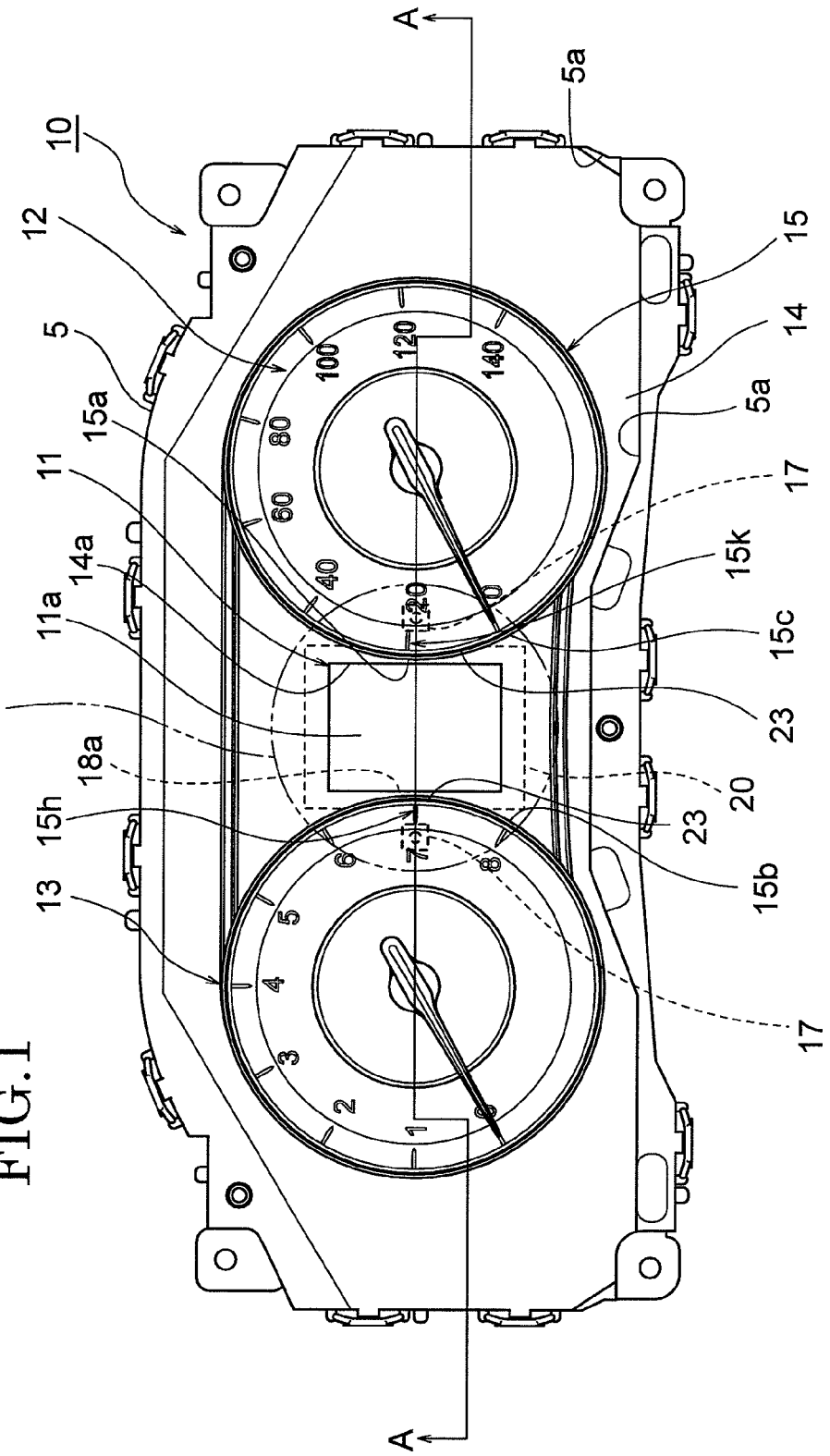
FIG. 1 is a front view illustrating one example of a layout of a combination meter as a meter of an embodiment of the present invention.
Figure 2:
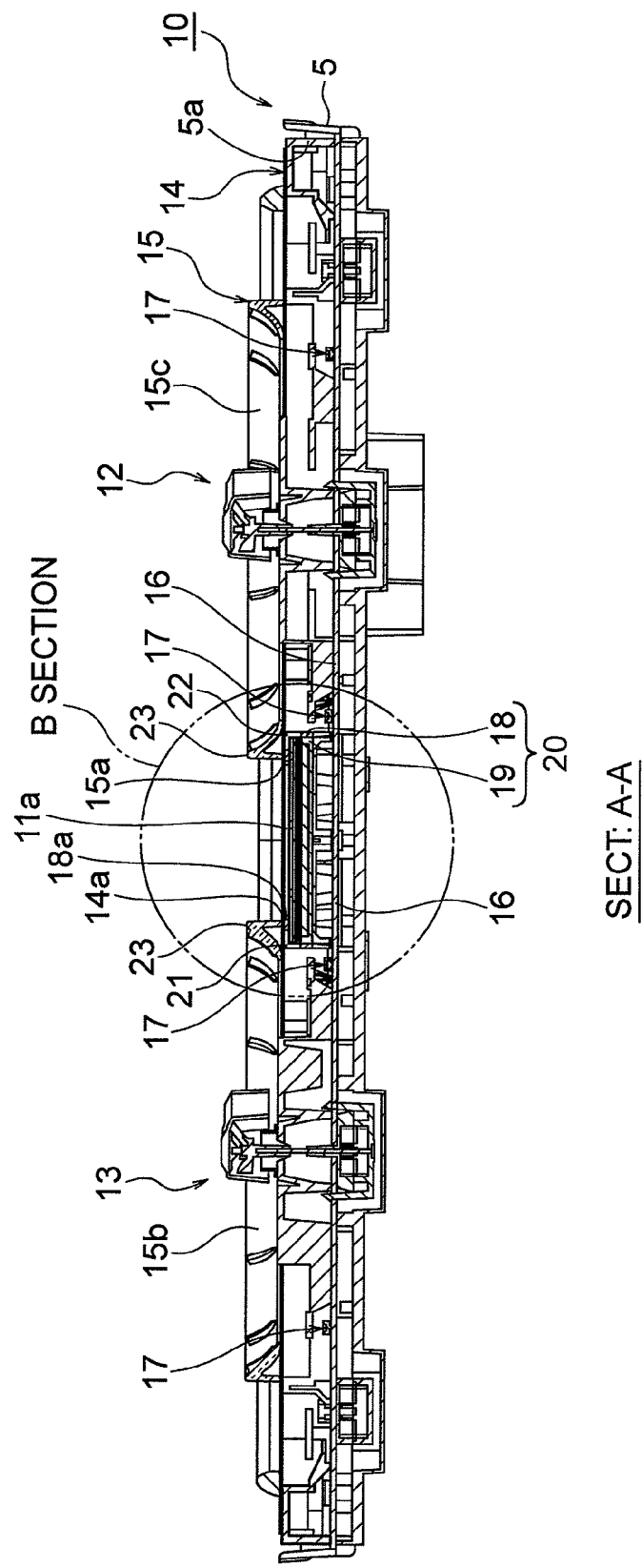
FIG. 2 is a sectional view along A-A line in FIG. 1 illustrating an inside constitution of the combination meter as the meter of the embodiment of the present invention.

The combination meter 10 includes an approximately box-shaped meter housing 5 having a dial opening 5a which opens toward the driver's seat 8b, a speedmeter 12 and a tachometer 13 as analogue meters accommodated in the meter housing 5, a liquid crystal display 11 having a liquid crystal display surface 11a which displays various vehicle information and a plate-like dial member 14 and a molded graduated-dial member 15 as a dial portion constituting a part of the display surface, which are located in front of the speedmeter 12 and the tachometer 13 and close the dial opening 5a, as illustrated in FIG. 1

Figure 3:
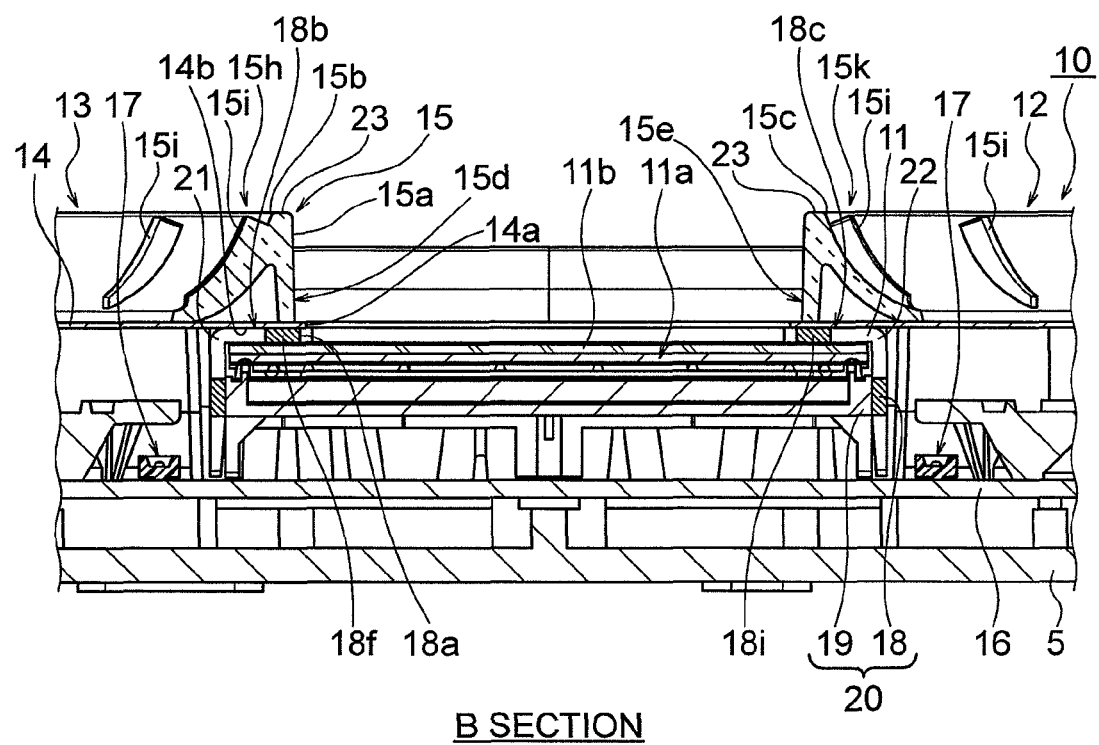
FIG. 3 is an enlarged sectional view of B section in FIG. 2 illustrating the meter of the embodiment of the present invention.

A circuit substrate 16 having a plurality of LEDs 17 as backlight sources is provided in the meter housing 5 as illustrated in FIG. 3. The plate-like dial member 14 and the molded graduated-dial member 15 are illuminated from the back side by the illumination light of the LEDs 17.

The liquid crystal display 11 is disposed between the speedmeter 12 and the tachometer 13 as illustrated in FIG. 1. The liquid crystal display surface 11a is disposed in an opening for a liquid crystal display 14a formed in the approximately central portion of the plate-like dial member 14 in the vehicle width direction. An opening 15a is provided between a pair of circular rings 15b, 15c integrally formed with the molded graduated-dial member 15 as a part of the dial plate.

Various vehicle information displayed on the liquid crystal display surface 11a is visible from the vehicle interior direction through the opening for the liquid crystal display 14a and the opening 15a between rings.

A resin LCD case member 20 is provided in the peripheral portion of the liquid crystal display surface 11a. The LCD case member 20 includes an LCD upper case 18 and an LCD lower case 19 which is fitted to the LCD upper case 18. The liquid crystal display surface 11a, an LCD glass member 11b and the like are housed in the LCD upper and lower cases 18, 19.

The LCD upper case 18 includes an approximately rectangular window 18a in which its longitudinal direction conforms to the vehicle up-and-down direction in accordance with the opening for the liquid crystal display 14a. As illustrated in FIG. 3, a non-printed translucent rim portion 14b formed in the peripheral portion of the opening for the liquid crystal display 14a of the plate-like dial member 14 and rim portions on a liquid crystal display side 15d, 15e as a part of the circular rings 15b, 15c are attached to case lateral edge portions 18b, 18c facing each other in the substantially vehicle width direction. The case lateral edge portions 18b, 18c, the translucent rim portion 14b and the rim portions on the liquid crystal display side 15d, 15e are overlapped.

Figure 4:
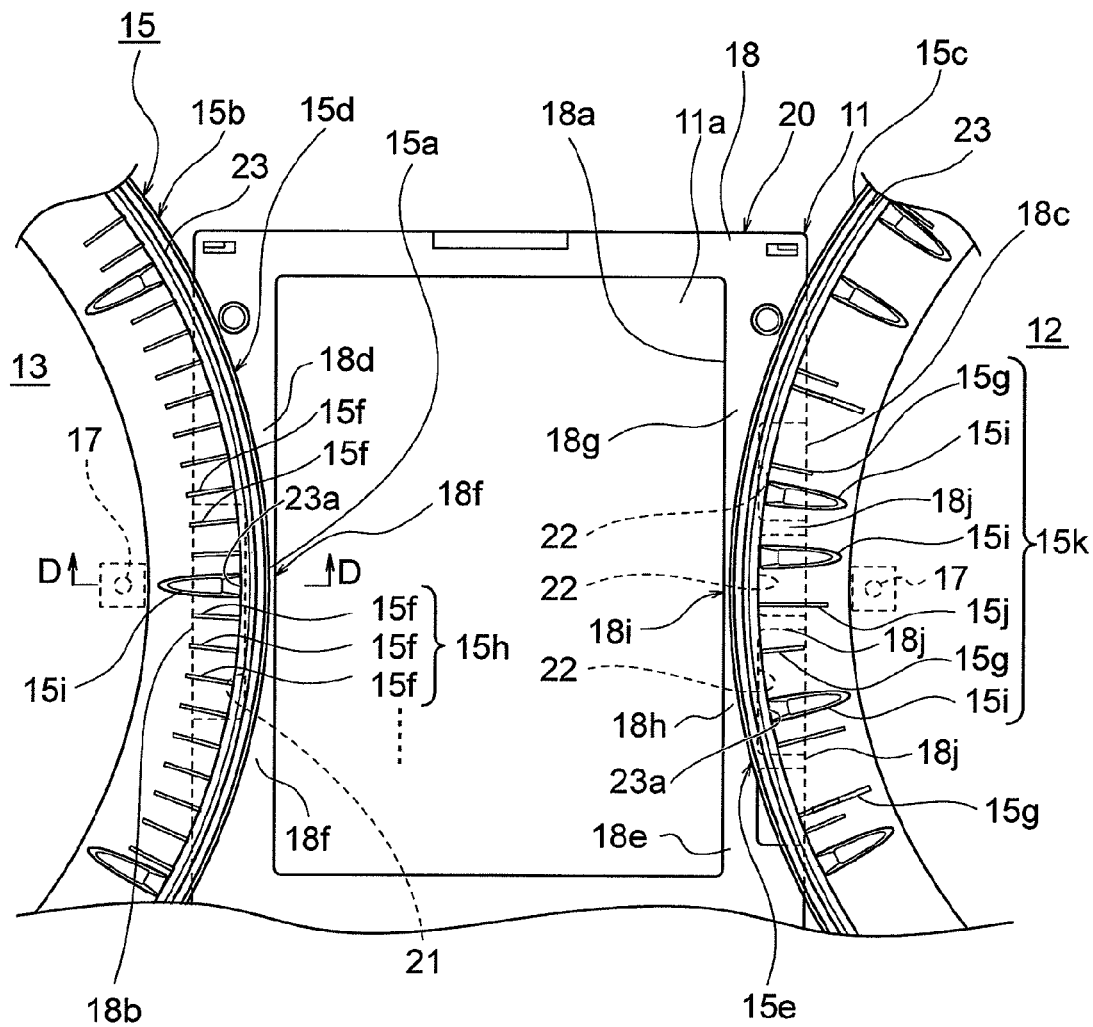
FIG. 4 is an enlarged sectional view of C section in FIG. 1 illustrating the meter of the embodiment of the present invention.

In addition, the translucent rim portion 14b of the plate-like dial member 14 is omitted in FIG. 4 for simplifying the description.

Figure 7:
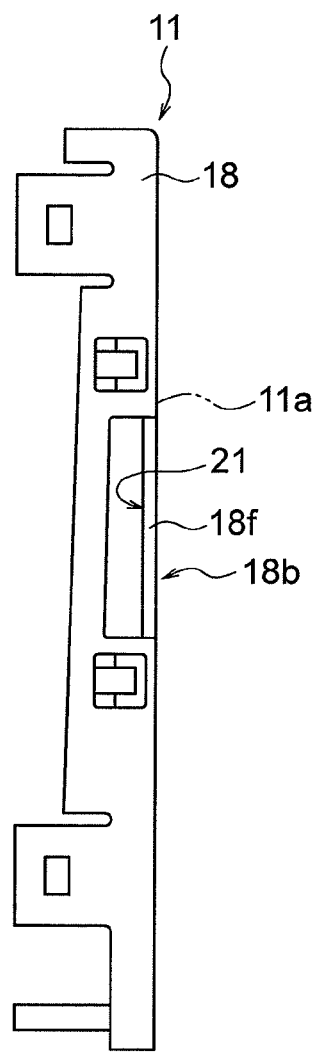
FIG. 7 is a left side view illustrating a constitution of a case member of a liquid crystal display in the meter of the embodiment of the present invention.
Figure 8:
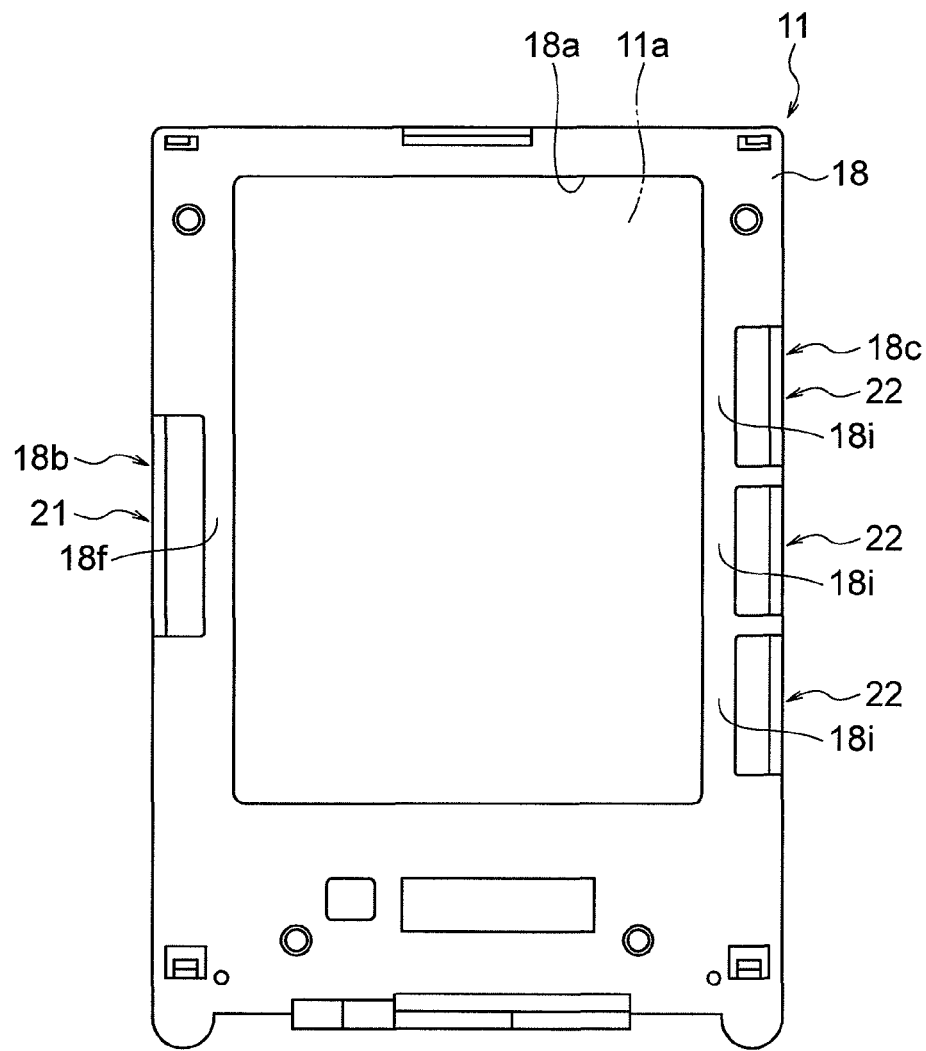
FIG. 8 is a front view illustrating the constitution of the case member of the liquid crystal display in the meter of the embodiment of the present invention.

As illustrated in FIGS. 7, 8, a long slit 21 as an illumination light-passing section having a cutout corner shape is formed in the case lateral edge portion 18b of the LCD upper case 18 of this embodiment. The longitudinal direction of the long slit 21 conforms to the direction to which the side of the LCD upper case 18 extends. The long slit 21 penetrates the case lateral edge portion 18b in the inside and outside direction of the liquid crystal display surface 11a, and extends in the vehicle width direction of the liquid crystal display surface 11a. The long slit 21 includes an approximately L-shape in section.

In this embodiment, upper and lower frames 18d, 18e of the case lateral edge portion 18b separated by the opening space of the long slit 21 are connected by a connection frame 18f.

Figure 9:
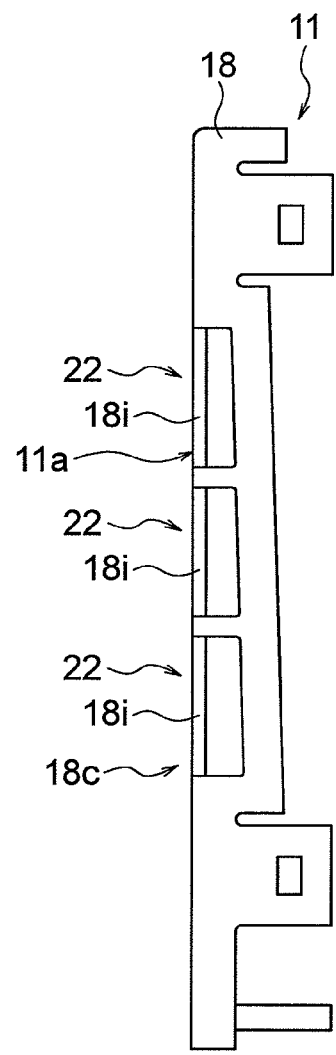
FIG. 9 is a right side view illustrating the constitution of the case member of the liquid crystal display in the meter of the embodiment of the present invention.
Figure 10:
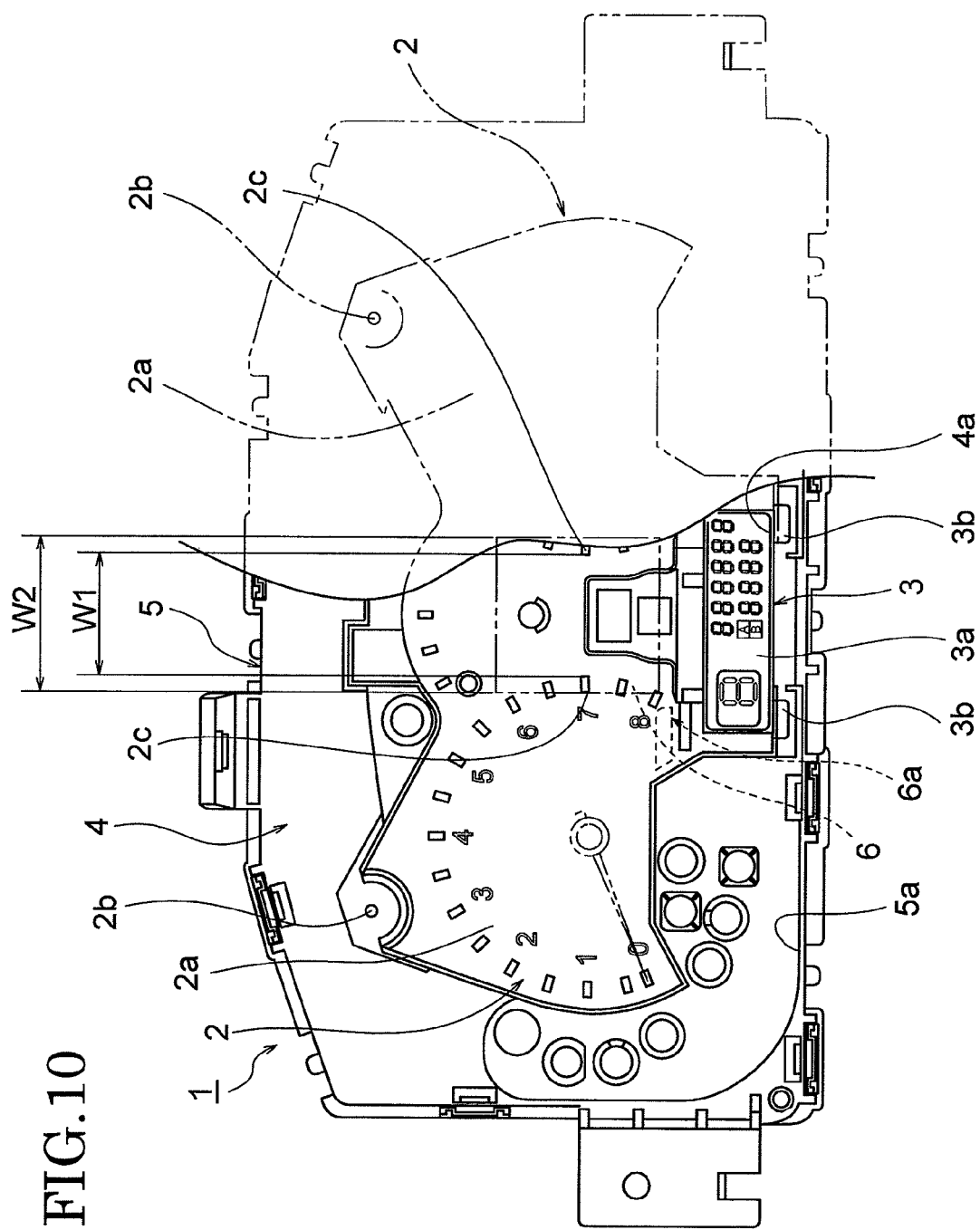
FIG. 10 is a front view illustrating a constitution of a combination meter with a transparent cover member removed as a conventional meter.

As illustrated in FIGS. 8, 9, a short slit 22 as an illumination light-passing section having a cutout corner shape is formed in the case lateral edge portion 18c of the LCD upper case 18. The longitudinal direction of the short slit 22 conforms to the direction to which the side of the LCD upper case 18 extends. The short slit 22 penetrates the case lateral edge portion 18b in the inside and outside direction of the liquid crystal display surface 11a, and extends in the vehicle width direction of the liquid crystal display surface 11a. The short slit 22 includes an approximately L-shape in section.

In this embodiment, upper and lower frames 18g, 18h of the case lateral edge portion 18c separated by a plurality of opening spaces of the short slits 22 are connected by connection frames 18i.

A plurality of reinforcing ribs 18j is formed along the vehicle width direction between the connection frames 18i and the remaining portions of the case lateral edge portion 18c at predetermined intervals in the up and down direction of the vehicle in the case lateral edge portion 18c.

In this embodiment, ring sections 23, 23 schematically defining the contours of the speedmeter 12 and the tachometer 13 in appearances are formed in the outermost rims of the circular rings 15b, 15c in the diameter direction, respectively, by metal decoration printing as non-translucent portions.

The liquid crystal display 11 is combined with the speedmeter 12 and the tachometer 13, such that the ring sections 23, 23 of the non-translucent portions of the circular rings 15b, 15c are overlapped with the connection frame 18f, 18i in a front view of the combination meter 10, and the outer circumferential portion of the dial is overlapped with a portion which is not backlight-illuminated As illustrated in FIG. 4, a red zone scale portion 15h as a scale portion indicating rev-limit is provided in the rim portion on the liquid crystal display side 15d of the circular ring 15b in accordance with the position of the long slit 21. The red zone scale portion 15h includes in the circumferential direction at equal intervals small scales 15f and large scales 15i, which are illuminated by the illumination light of the LEDs 17 from the back side, and transmit a part or the entire illumination light in the vehicle interior direction, as a plurality of translucent indicators.

A speed display scale portion 15k as a scale portion is provided in the rim portion on the liquid crystal display side 15e of the circular ring 15c in accordance with the positions of the short slits 22. The speed display scale portion 15k includes in the circumferential direction at equal intervals a plurality of large scales 15i, intermediate scales 15j and small scales 15g, which are illuminated by the illumination light of the LEDs 17 from the back side, and transmit a part or the entire illumination light in the vehicle interior direction.

The inside edges of the long slit 21 and the short slits 22 are located in circular virtual lines 23a, 23a connecting the outer edge portions of the speed display scale portion 15k and the red zone scale portion 15h.

In this embodiment, the circular virtual lines 23a, 23a connecting the outer edge portions of the scales conform to the inner rims of the ring sections 23, 23, respectively, as illustrated in FIG. 4.

The top portions of the circular virtual lines 23a, 23a conform to the inside edges of the window 18a in the vehicle width direction as illustrated in FIG. 4.

For this reason, most of the outer circumferential portions of the scales connected by the circular virtual lines overlap with the connection frames 18f, 18i.

Each of the large scales 15i, intermediate scales 15j and small scales 15g are irradiated by the illumination light of the LEDs 17 because each of the scales is located between the reinforcing ribs 18j, 18j.

A plurality of large scales 15i, intermediate scales 15j and small scales 15g in the speedmeter 12 of this embodiment is illustrated in the same figure as illustrated in FIG. 4. However, they are appropriately used depending on a case in which a speed is displayed in km/h or mile/h.

Next, the operation and effect of the meter of this embodiment will be described.

In the meter of the embodiment as constituted above, the illumination light by the lighting of the LEDs 17, 17 is irradiated to the corner portions of the case lateral edge portions 18b, 18c of the liquid crystal display 11 in the vehicle width direction from the back side of the plate-like dial member 14 of each of the speedmeter 12 and the tachometer 13.

The illumination light of the respective LEDs 17, 17 passes through the long and short slits 21, 22 each having a cutout corner shape.

The illumination light of the LEDs 17, 17 which has passed through the long and short slits 21, 22 passes through the translucent rim portions 14b, 14b of the plate-like dial member 14, and illuminates the portion of each circular ring 15b, 15c of the molded graduated-dial member 15, which is overlapped with the case lateral edge portion 18b, 18c.

Therefore, the circular rings 15b, 15c are backlight-illuminated similar to the other portions, so that it becomes possible to reduce the illumination unevenness with the circumferential portion.

In the combination meter 10 described in the present embodiment, the circular rings 15b, 15c are overlapped with the case lateral edge portions 18b, 18c as illustrated in FIGS. 1, 4. With this constitution, the display portions of the dial portion for use in the displays of the speedmeter 12 and the tachometer 13 are able to be located closer to the liquid crystal display surface 11a for use in the display of the liquid crystal display 11.

For this reason, it becomes possible to increase the displayable area of the dial portion in the limited display surface of the combination meter 10 illustrated in FIG. 1, so that the layout freedom can be improved and, in addition, the display area can be effectively used.

The external appearance quality is also improved due to the even backlight illumination.

More specifically, although a part of the illumination light which has reached the corner portions of the case lateral edge portions 18b, 18c from the LEDs 17, 17 is shielded by the connection frames 18f, 18i, the shade is overlapped with the ring sections 23, 23 provided in the circular rings 15b, 15c of the speedmeter 12 and the tachometer 13, so as to prevent illumination unevenness.

In the display portion of the combination meter 10 illustrated in FIG. 4, the ring sections 23, 23 of the circular rings 15b, 15c are overlapped with the connection frames 18f, 18i formed in the case lateral edge portions 18b, 18c, respectively, in the vehicle width direction. With this constitution, each of the speedmeter 12 and the tachometer 13 is combined with the liquid crystal display device 11.

Therefore, the portions of the circular rings 15b, 15c over the case lateral edge portions 18b, 18c which are not used as display surfaces in the conventional constitution can be effectively used as the luminous red zone scale portion 15h and speed display scale portion 15k even if the tops of the circular virtual lines 23a, 23a connecting the outer edge portions of the respective scales of the speedmeter 12 and the tachometer 13 are located closer to each other in the vehicle width direction. Thus, the display area of the limited display portion of the combination meter 10 can be effectively used.

In this embodiment, the long slit 21 is consecutively formed in the extending direction of the red zone scale portion 15h which is formed in the circular ring 15b and is provided with a plurality of small scales 15f.

With this constitution, the plurality of small scales 15f is backlight-illuminated with an even light volume even if a plurality of equally formed small scales 15f of the red zone scale portion 15h is arranged at small intervals.

Thus, a preferable external appearance quality can be obtained without generating illumination unevenness in the circumferential direction of the circular ring 15b.

Embodiment 1

Figure 5:
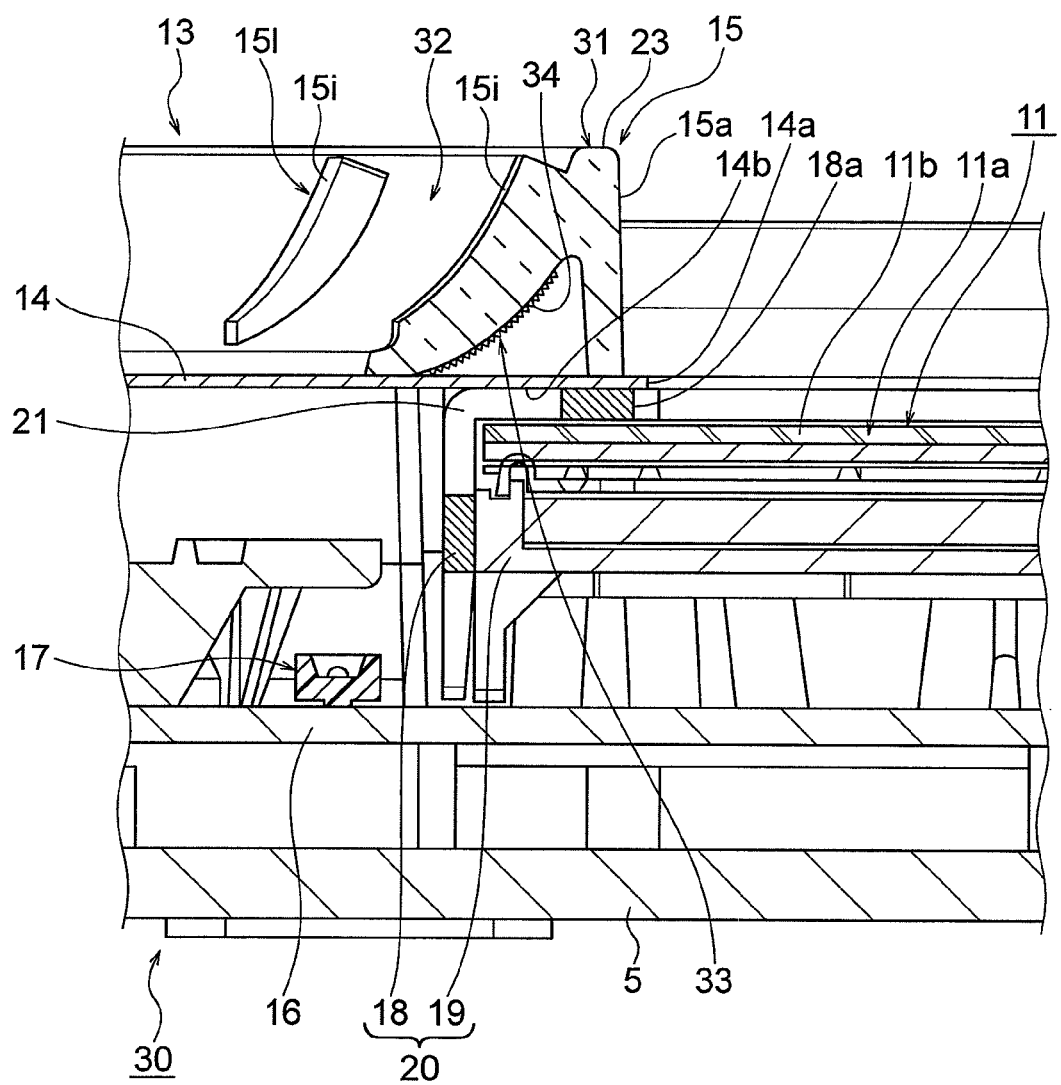
FIG. 5 is an enlarged sectional view of a position along D-D line in FIG. 4 illustrating a meter of Embodiment 1 of the present invention.

FIG. 5 is a view illustrating a combination meter 30 as a meter of Embodiment 1 of the present invention.

In addition, the same reference numbers are applied to the same portions in the above-described embodiment.

First of all, the constitutional difference is mainly described. In the combination meter 30 of Embodiment 1, a crimp portion 34 as an asperity is formed on a back face 33 of an inclined surface portion 32 provided with a scale portion 15I including a plurality of large scales 15i in a circular ring 31 corresponding to the circular ring 15b of the embodiment.

Next, the operation and effect of the meter of Embodiment 1 will be described.

In the combination meter 30 of Embodiment 1 as constituted above, the crimp portion 34 formed in the back face 33 of the inclined surface portion 32 provided with the scale portion 15I diffuses the illumination light of the LEDs 17 to obtain even backlight illumination due to the diffusion.

In Embodiment 1, the illumination unevenness reduced by the long slit 21 is further diffused by the crimp portion 34, so that the light volume difference can be reduced due to the diffusion. Therefore, the outer appearance quality of the circular ring 31 can be further improved.

The other constitutions and the operation and effect are the same as those of the meter in the above-described embodiment. Thus, the description thereof will be omitted.

The meters according to the embodiment and Embodiment 1 are described in detail above with reference to the drawings. However, the specific constitution is not limited to the combination meters 10, 30 of the embodiment and Embodiment 1. It should be appreciated that variations may be made in the embodiment and Embodiment 1 described by persons skilled in the art without departing from the scope of the present invention.

For example, the individually provided plate-like dial member 14 and the molded graduated-dial member 15 are combined as the dial portion constituting a part of the display surface in the embodiment. However, the constitution is not limited thereto. For example, a decoration ring can be integrally formed with a plate-like dial. The shape of the display surface, number, material and colors of the meters and warning lights are not especially limited.

According to the meter as constituted above, the illumination light passes through the illumination passing section having a cutout corner shape even if the illumination light is irradiated toward the corner portions of the case lateral edge portions of the liquid crystal display from the back side.

With this constitution, the portions overlapped with the corner portions of the case lateral edge portions, for example, the scale portion and the like are backlight-illuminated by the illumination light from the backlight source, which has passed through the illumination light-passing section, and thus, illumination unevenness with the circumferential portion can be reduced.

Moreover, even if the illumination light from the backlight source is blocked by the connection frames, illumination unevenness does not occur because the shade is overlapped with the non-translucent portion of the dial portion.

This constitution makes it possible to maintain a preferable external appearance quality and to effectively use the display area of the display even if the virtual lines connecting the outer edge portions of the translucent indicators are closely arranged such that the outer circumferential portions of the scale portions, for example as the non-translucent portions are overlapped with the connection frames formed in the case lateral edge portions.

Therefore, the dial portion for use in the display of the analogue meter and the liquid crystal display surface for use in the display of the liquid crystal display are closely positioned, so that the displayable area of the dial portion can be expanded in the limited display surface of the meter.

Thus, the external appearance quality can be improved due to the even backlight illumination while improving the layout freedom and effectively using the display area.

The meter as constituted above includes the asperity formed in the dial portion. This asperity diffuses the illumination light.

This constitution makes it possible to further reduce the illumination unevenness reduced by the illumination light-passing section due to the diffusion, so that a preferable external appearance quality can be obtained.

The meter as constituted above includes the consecutive illumination light-passing section formed in the extending direction of the scale portion formed in the dial portion.

With this constitution, a plurality of scales of the scale portion is backlight-illuminated with an even light volume. Thus, a preferable external appearance quality can be obtained without generating illumination unevenness.

In the present embodiment, a part of the translucent indicator formed in the dial portion is disposed to overlap with the case member. However, the dial portion can be disposed not to overlap with the case member.

In this case, if a part of the translucent indicator of the dial portion becomes the shadow of the light from the light source by the case member, the illumination light-passing section can be formed in the portion forming the shadow of the case member.

Namely, if a part of the case member is inserted on the optical path from the light source to the translucent indicator, the illumination light-passing section can be formed in the inserted portion.

The present application is based on and claims priority from Japanese Patent Application No. 2009-254720, filed on Nov. 6, 2009, the disclosure of which is hereby incorporated by reference in its entirety.

The invention claimed is:

1. A meter, comprising:
   a liquid crystal display having a liquid crystal display surface and a case housing the liquid crystal display surface;
   an analogue meter including a dial portion having a plurality of translucent indicators, the dial portion being arranged such that at least a part of the translucent indicators is disposed so as to overlap with a lateral edge portion of the case, and such that a part of the translucent indicators does not overlap with the lateral edge portion of the case;
   a light source configured to illuminate the translucent indicators of the dial portion, including the part of the translucent indicators which does not overlap with the lateral edge portion of the case, from a back side of the dial portion, the light source being disposed outside of the case; and
   an illumination light-passing section configured to pass light from the light source disposed outside of the case toward the part of the translucent indicators which overlaps with the lateral edge portion of the case, the illumination light-passing section being formed in the lateral edge portion of the case in a position where the part of the translucent indicators which overlaps with the lateral edge portion is directly irradiated with the light from the light source.

2. The meter according to claim 1, wherein the illumination light-passing section is disposed close to a virtual line connecting outer edge portions of the translucent indicators.

3. The meter according to claim 1, wherein the dial portion includes an asperity configured to diffuse the light from the light source.

4. The meter according to claim 1, wherein the illumination light-passing section is a cutout formed in the lateral edge portion of the case.

5. The meter according to claim 4, wherein the dial portion includes a scale portion in which a plurality of scales made of transmissive slits is equally formed in a circumferential direction, and the illumination light-passing section made of consecutive cutouts is provided in an extending direction of the scale portion.

6. The meter according to claim 4, wherein the case includes a connection frame connecting portions remaining in the lateral edge portion of the case due to the formation of the cutout.

7. The meter according to claim 6, wherein the dial portion includes a non-translucent portion, and the non-translucent portion is disposed to overlap with the connection frame.

* * * * *